United States Patent
Bolonhezi

(10) Patent No.: US 6,701,968 B2
(45) Date of Patent: Mar. 9, 2004

(54) FLEXIBLE PVC HELICAL HOSE

(75) Inventor: Mauricio Bolonhezi, Sao Paulo (BR)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/191,738

(22) Filed: Jul. 9, 2002

(65) Prior Publication Data

US 2003/0029513 A1 Feb. 13, 2003

Related U.S. Application Data

(60) Provisional application No. 60/309,554, filed on Aug. 2, 2001.

(51) Int. Cl.[7] ................................................ F16L 11/08
(52) U.S. Cl. ...................... 138/132; 138/129; 138/122; 138/174
(58) Field of Search ................................ 138/129, 173, 138/150, 121, 122, 177, 153, 172, 144, 174

(56) References Cited

U.S. PATENT DOCUMENTS

| | | | | |
|---|---|---|---|---|
| 3,047,026 A | * | 7/1962 | Kahn | 138/122 |
| 3,117,596 A | | 1/1964 | Kahn | 138/122 |
| 3,130,753 A | | 4/1964 | Monnen | 138/122 |
| 3,917,500 A | | 11/1975 | Petzetakis et al. | 156/195 |
| 3,926,223 A | | 12/1975 | Petzetakis et al. | 138/129 |
| 4,033,808 A | | 7/1977 | Petzetakis et al. | 156/425 |
| 4,140,154 A | * | 2/1979 | Kanao | 138/132 |
| 4,304,266 A | * | 12/1981 | Kutnyak et al. | 138/129 |
| 4,350,547 A | * | 9/1982 | Kanao | 156/143 |
| 4,490,575 A | * | 12/1984 | Kutnyak | 174/47 |
| 4,628,966 A | * | 12/1986 | Kanao | 138/122 |
| 4,644,977 A | | 2/1987 | Arterburn | 138/137 |
| 4,956,234 A | | 9/1990 | Morales | 428/36.5 |
| 5,046,531 A | * | 9/1991 | Kanao | 138/122 |
| 5,702,132 A | * | 12/1997 | Friederich et al. | 285/235 |
| 5,806,567 A | * | 9/1998 | Fukui et al. | 138/132 |
| 5,899,237 A | * | 5/1999 | Akedo et al. | 138/129 |
| 5,918,642 A | * | 7/1999 | Akedo et al. | 138/132 |
| 6,225,365 B1 | | 5/2001 | Zerafati et al. | 521/98 |
| 6,227,249 B1 | * | 5/2001 | Akedo et al. | 138/137 |

FOREIGN PATENT DOCUMENTS

GB 850421 10/1960

OTHER PUBLICATIONS

EOP Search Report.

* cited by examiner

Primary Examiner—Patrick Brinson
(74) Attorney, Agent, or Firm—John D. DeLong

(57) ABSTRACT

A flexible hose comprising
(A) a soft hose main body formed of polyvinyl chloride resin; and
(B) a helical rigid reinforcing means embedded in the soft hose main body formed of polyvinyl chloride resin wherein the specific gravity of the helical rigid reinforcing means is less than the specific gravity of the hose main body and the overall specific gravity of the flexible hose is less than 1.0 g/cm³.

10 Claims, 1 Drawing Sheet

FLEXIBLE PVC HELICAL HOSE

The Applicants hereby incorporate by reference prior U.S. Provisional Application Ser. No. 60/309,554, filed on Aug. 2, 2001.

BACKGROUND OF THE INVENTION

This invention relates to flexible PVC helical hoses that float in water. Conventional PVC helical hoses have an overall specific gravity of greater than 1.0 g/cm$^3$. As a result of this, when used near water, for example in a swimming pool, the hose sinks. Hose sinking makes it more difficult to clean the pool using the hose because of the cumbersome weight. Accordingly, due to this disadvantage, it would be desirable to have a flexible PVC helical hose that floats.

SUMMARY OF THE INVENTION

The present invention relates to a PVC helical hose where the specific gravity of the helical rigid reinforcing means is less than the main body of the hose and the overall specific gravity of the hose is less than 1.0 g/cm$^3$.

BRIEF DESCRIPTION OF THE DRAWINGS

The drawings illustrate flexible hoses embodying this invention.

DESCRIPTION OF THE PREFERRED EMBODIMENT

There is described a flexible hose comprising (A) a soft hose main body formed of polyvinyl chloride resin; and (B) a helical rigid reinforcing means embedded in the soft hose main body formed of polyvinyl chloride resin wherein the specific gravity of the helical rigid reinforcing means is less than the specific gravity of the hose main body and the overall specific gravity of the flexible hose is less than 1.0 g/cm$^3$.

Figure 1:
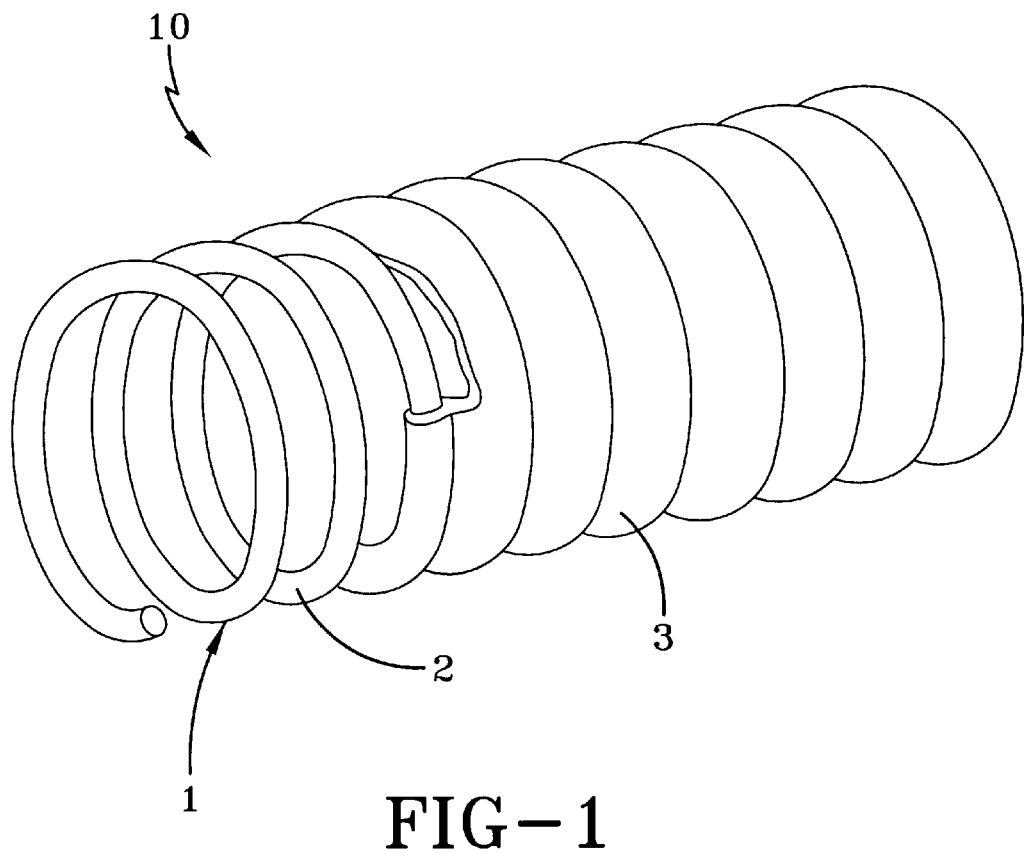
FIG. 1 is a perspective view partly broken away.
Figure 2:
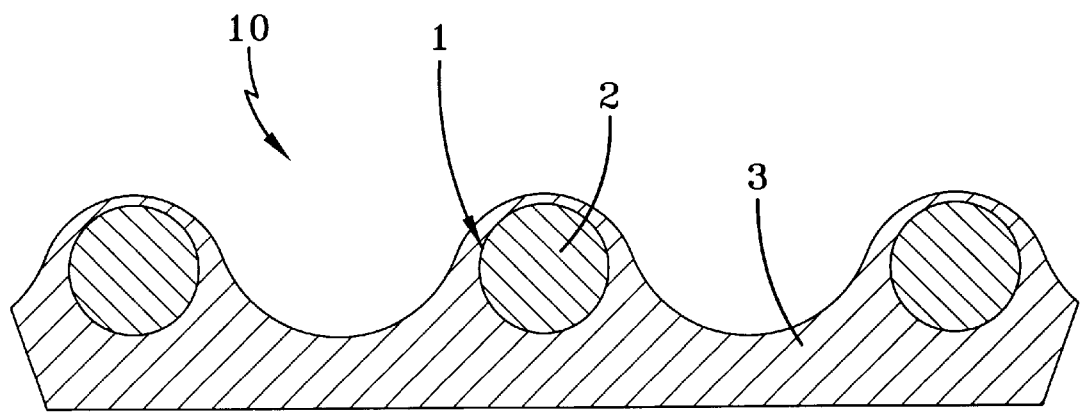
FIG. 2 is an enlarged side elevation in vertical section showing the main portion of FIG. 1.

Reference is now made to FIGS. 1 and 2 which illustrates a flexible PVC helical hose of the present invention which is designated generally by the reference number 10. The hose 10 has a helical rigid reinforcing means 1 comprising a single helical reinforcement 2 made of polyvinyl chloride resin. The helical rigid reinforcing means is embedded in a soft hose main body 3 also formed of polyvinyl chloride resin. The soft hose main body 3 forms the tubular wall of the hose continuously extending axially of the hose and has the reinforcing means 1 embedded therein.

The cross-section of the rigid reinforcing means 1 shown in FIGS. 1 and 2 are circular. However, the cross-section may be of various shapes, including U-shaped, crescent, square, oval and the like.

The hose 10 of the present invention is characterized by an overall specific gravity of less than 1.0 g/cm$^3$. Preferably, the specific gravity ranges from 0.90 to 0.99 g/cm$^3$.

The specific gravity of the soft hose main body 3 generally ranges from 1.20 to 1.30 g/cm$^3$. Preferably the specific gravity ranges from 1.21 to 1.26 g/cm$^3$.

The specific gravity of the rigid reinforcing means 1 is less than the specific gravity of the hose main body. Generally speaking, the specific gravity ranges from 0.60 to 0.80 g/cm$^3$. Preferably the specific gravity ranges from 0.65 to 0.75 g/cm$^3$.

Common ingredients which are added to the PVC compound for use as the soft hose main body include lubricants (0.35 phr to 0.45 phr), stabilizers (3 to 4 phr), plasticizers (50 to 70 phr), and pigments (0.0001 to 0.001 phr). The above levels of conventional ingredients may be varied, depending on the hose, so long as the specific gravity criteria is observed. For example, the amount of pigment may be increased depending on the desired color if a clear hose is not desired.

Common ingredients which are added to the PVC compound for use as the rigid reinforcing means 1 include calcium carbonate (3 to 7 phr), stabilizer (2 to 5 phr), viscosity (0.1 to 0.5 phr), modifiers (4 to 6 phr) and lubricants (0.1 to 3 phr), such paraffin waxes, low molecular weight polyethylene, polyethylene wax, oxidized polyethylene, fatty acids and thin salts, fatty alcohols, metal soaps, fatty amides and fatty acids.

In addition to the above, a blowing agent is used in order to achieve an optimum specific gravity. Blowing agents may be physical blowing agents, inert gaseous blowing agents and/or chemical blowing agents. Representative examples of physical blowing agents include gaseous hydrofluorocarbons ("HFC") such as HFC-134a (1,1,1,2-tetrafluoroethane), 152a (1,1-difluoroethane), 32 (difluoromethane), 143a (1,1,1-trifluoroethane), 134 (1,1,2,2-tetraflouroethane), 245fa (1,1,1,3,3-pentafluoroethane, 125 (pentafluoroethane) and mixtures thereof. An example of an inert gaseous blowing agent is carbon dioxide. Examples of chemical blowing agents include azodicarbonamide, ethers, alcohols and ketones.

In practice, the blowing agent is introduced into the PVC formulation prior to or at the extruder. Conventional extruders, such as single or twin screw, may be used.

The amount of blowing agent needed to produce a PVC foam with a specific gravity of from 0.60 to 0.80 g/cm$^3$ depends on several factors, such as the molecular weight of the blowing agent and the bulk density of the PVC matrix. For example, the amount of azodicarbonamide may range from 0.3 to 0.5 phr.

EXAMPLE

A flexible PVC helical hose was prepared that had the design of FIG. 1. The hose was produced using two plastic extruders and a common die. In order to produce the flexible PVC, a 60 mm plastic extruder ran at 150±10° C. (300±50° F.), and for the rigid PVC, a 60 mm plastic extruder ran 120±5° C. (250±5° C.). The overall specific gravity of the hose was 0.98 g/cm$^3$. The specific gravity of the PVC formulation used in the helical rigid reinforcing means was 0.70 g/cm$^3$ based upon the recipe below:

| | |
|---|---|
| PVC resin[1] | 100 phr |
| Calcium carbonate | 5 phr |
| Stablizer[2] | 3.5 phr |
| Viscosity modifier[3] | 5 phr |
| Blowing agent[4] | 0.4 phr |
| Lubricant[5] | 0.2 phr |

[1] A polyvinyl chloride resin produced and commercially marketed by OPP Petroquimica S/A - Odebrecht Group, under the designation SP700-HP wherein K = 57 ± 1.
[2] A lead based stabilizer marketed by Bärlocher under the designation Baropan ™ SMS 108B
[3] Paraloid ™ K400 marketed by Rohm and Hoas Company
[4] Azodicarbonamide
[5] Polyethylene wax The specific gravity of the PVC formulation for use in the body portion was 1.23 g/cm$^3$ based upon the recipe below.

| | |
|---|---|
| PVC resin[1] | 100 phr |
| Plasticizer[2] | 60 |
| Stabilizer[3] | 3.5 |
| Stearic acid | 0.4 phr |
| Pigment[4] | 0.0005 phr |

[1]A polyvinyl chloride resin produced and commercially marketed by OPP Petroquimica S/A - Odebrecht Group, under the designation SP1300-HP wherein K = 71 ± 1.
[2]Dioctyl phthalate
[3]Ba/Cd/Zn stabilizer marketed by Bärlocher under the designation Barostab ™ BCR-6022.
[4]Sandoplast purple RSB While present exemplary embodiments of this invention and methods of practicing the same have been illustrated and described, it will be recognized that this invention may be otherwise variously embodied and practiced within the scope of the following claims.

What is claimed is:

1. A flexible hose comprising
   (A) a soft hose main body formed of polyvinyl chloride resin; and
   (B) a helical rigid reinforcing means embedded in the soft hose main body formed of polyvinyl chloride resin wherein the specific gravity of the helical rigid reinforcing means is less than the specific gravity of the hose main body and the overall specific gravity of the flexible hose is less than 1.0 g/cm$^3$.

2. The flexible hose of claim 1 wherein the helical rigid reinforcing means is made of foamed PVC.

3. The flexible hose of claim 1 wherein the specific gravity of the helical rigid reinforcing means ranges from 0.60 to 0.80 g/cm$^3$.

4. The flexible hose of claim 1 wherein the specific gravity of the soft hose main body ranges from 1.20 to 1.30 g/cm$^3$.

5. The flexible hose of claim 1 wherein the overall specific gravity of the flexible hose ranges from 0.90 to 0.99 g/cm$^3$.

6. The flexible hose of claim 1 wherein the specific gravity of the helical rigid reinforcing means range from 0.65 to 0.75 g/cm$^3$.

7. The flexible hose of claim 1 wherein the specific gravity of the soft hose main body ranges from 1.21 to 1.26 g/cm$^3$.

8. The flexible hose of claim 1 wherein the cross-section of the rigid reinforcing means is selected from the group consisting of circular, U-shaped, crescent, square and oval.

9. The flexible hose of claim 8 wherein the cross-section is circular.

10. The flexible hose of claim 8 wherein the cross-section is crescent.

* * * * *